(12) United States Patent
Liu et al.

(10) Patent No.: US 11,714,341 B2
(45) Date of Patent: Aug. 1, 2023

(54) PROJECTION DEVICE WITH TANK FOR DISSIPATING HEAT

(71) Applicant: Coretronic Corporation, Hsin-Chu (TW)

(72) Inventors: Wei-Chi Liu, Hsin-Chu (TW); Kai-Lun Hou, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/195,658

(22) Filed: Mar. 9, 2021

(65) Prior Publication Data

US 2021/0286242 A1    Sep. 16, 2021

(30) Foreign Application Priority Data

Mar. 13, 2020   (CN) .......................... 202010173653.5

(51) Int. Cl.
*G03B 21/16*   (2006.01)

(52) U.S. Cl.
CPC ..................... *G03B 21/16* (2013.01)

(58) Field of Classification Search
CPC .............................. G03B 21/16; H04N 9/3144
See application file for complete search history.

(56) References Cited

U.S. PATENT DOCUMENTS

| 5,560,344 A | * | 10/1996 | Chan | .................. | F02M 37/0064 |
| | | | | | 123/25 C |
| 2005/0185244 A1 | * | 8/2005 | Fujimori | .............. | H04N 9/3144 |
| | | | | | 353/54 |
| 2005/0200816 A1 | * | 9/2005 | Hsu | ........................ | G03B 21/16 |
| | | | | | 353/57 |
| 2009/0009727 A1 | * | 1/2009 | Osumi | ................... | G03B 21/16 |
| | | | | | 353/54 |
| 2009/0234513 A1 | * | 9/2009 | Wiggins | ................ | F24H 9/2007 |
| | | | | | 700/300 |

(Continued)

FOREIGN PATENT DOCUMENTS

| CN | 202101804 | 1/2012 |
| CN | 102754537 | 9/2015 |
| CN | 207020447 | 2/2018 |
| CN | 207456559 | 6/2018 |
| CN | 207658436 | 7/2018 |
| CN | 108444565 | 8/2018 |

(Continued)

OTHER PUBLICATIONS

"Office Action of China Counterpart Application", dated Jan. 28, 2022, p. 1-p. 13.

(Continued)

*Primary Examiner* — Bao-Luan Q Le
(74) *Attorney, Agent, or Firm* — JCIPRNET (57) ABSTRACT

A projection device includes at least one heat source and a heat dissipation module. The heat dissipation module is connected to the heat source and is configured to dissipate heat energy generated by the heat source. The heat dissipation module includes a tank, at least one radiator, at least one cold plate, a cooling fluid, and a connection pipe. The connection pipe connects the tank, the radiator, and the cold plate, so that the cooling fluid flows in the heat dissipation module. The tank includes a pressure sensing device configured to measure a liquid level of the cooling fluid in the tank. Also, a tank is provided. The projection device provided in the disclosure can learn the liquid level of the tank in real-time, and the design cost is low.

17 Claims, 5 Drawing Sheets

(56) References Cited

U.S. PATENT DOCUMENTS

| | | | | |
|---|---|---|---|---|
| 2010/0245778 | A1* | 9/2010 | Yanagisawa | G03B 21/16 353/54 |
| 2011/0088480 | A1* | 4/2011 | Koehler | G01L 19/148 73/753 |
| 2012/0298339 | A1* | 11/2012 | Masuda | G03B 21/16 165/104.33 |
| 2013/0293852 | A1* | 11/2013 | Bullwinkel | H04N 9/3144 353/54 |
| 2014/0320061 | A1* | 10/2014 | Daniel | H01M 8/0482 320/103 |
| 2015/0144336 | A1* | 5/2015 | Hardin | E21B 21/106 166/250.01 |
| 2016/0201943 | A1* | 7/2016 | Alsberg | F24H 9/2007 122/14.31 |
| 2017/0019649 | A1* | 1/2017 | Fukuyama | G03B 21/20 |
| 2019/0041731 | A1* | 2/2019 | Katayama | H04N 9/3144 |

FOREIGN PATENT DOCUMENTS

| | | |
|---|---|---|
| CN | 207833209 | 9/2018 |
| CN | 108937749 | 12/2018 |
| CN | 208480411 | 2/2019 |
| CN | 109434692 | 3/2019 |
| CN | 209003575 | 6/2019 |
| CN | 110685243 | 1/2020 |
| CN | 213036618 | 4/2021 |
| TW | I306503 | 2/2009 |
| TW | 201345114 | 11/2013 |

OTHER PUBLICATIONS

"Office Action of China Counterpart Application", dated Sep. 14, 2022, p. 1-p. 9.

* cited by examiner

PROJECTION DEVICE WITH TANK FOR DISSIPATING HEAT

CROSS-REFERENCE TO RELATED APPLICATION

This application claims the priority benefit of China application serial no. 202010173653.5, filed on Mar. 13, 2020. The entirety of the above-mentioned patent application is hereby incorporated by reference herein and made a part of this specification.

BACKGROUND

Technical Field

The disclosure relates to an optical device and a cooling device, and particularly relates to a projection device and a tank.

Description of Related Art

In existing projectors, a liquid cooling module is used to cool the heat source therein (e.g., a semiconductor light source such as a light-emitting diode or a laser). In the cooling module, the tank is used to store a cooling fluid to replenish the cooling fluid lost during long-term operation. In the related art, to confirm the liquid level in a tank, a transparent pipe is generally provided outside the tank. However, if such a transparent pipe is made of glass (e.g., a glass tube level gauge), it may easily break. If a transparent plastic material is used, it may react with the solution inside, which may cause corrosion and cracking. Therefore, when a transparent pipe is used, it is required to select specific materials, and it is required to read the liquid level by the human eye.

In addition, the level gauge used in a general automobile fuel tank is provided with a plurality of contacts thereon. The level indicator is connected to the float in the tank. The position of the float changes in height along with the liquid level in the tank. At this time, the level indicator is in contact with different contacts as the position of the float changes in height. Therefore, the liquid level can be determined in real-time from the level gauge. Although this method allows reading of the liquid level in real-time, the design of the float requires a certain space, and the contacts of the level gauge require a precise design and higher costs.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a projection device and a tank. The projection device can learn the liquid level of the tank in real-time, and the design cost is low.

Other objectives and advantages of the disclosure can be further understood from the technical features disclosed herein.

To achieve one, some, or all of the above-mentioned objectives or other objectives, an embodiment of the disclosure provides a projection device including at least one heat source and a heat dissipation module. The heat dissipation module is connected to the heat source and is configured to dissipate heat energy generated by the heat source. The heat dissipation module includes a tank, at least one radiator, at least one cold plate, a cooling fluid, and a connection pipe. The connection pipe connects the tank, the at least one radiator, and the at least one cold plate, so that the cooling fluid flows in the heat dissipation module. The tank includes a pressure sensing device configured to measure a liquid level of the cooling fluid in the tank.

To achieve one, some, or all of the above-mentioned objectives or other objectives, an embodiment of the disclosure provides a tank including an accommodating space and a pressure sensing device. The accommodating space is configured to accommodate a cooling fluid. The pressure sensing device is configured to measure a liquid level of the cooling fluid in the accommodating space.

Based on the above, the embodiments of the disclosure exhibit at least one of the following advantages or effects. By measuring the liquid level of the cooling fluid in the tank through the pressure sensing device, the projection device can learn the liquid level of the tank in real-time, and the design cost is low.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
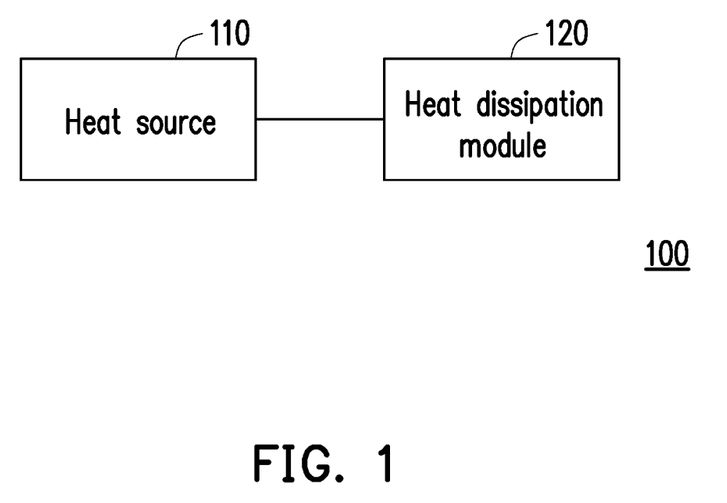
FIG. 1 is a schematic view showing a projection device according to an embodiment of the disclosure.

FIG. 1 is a schematic view showing a projection device according to an embodiment of the disclosure. Referring to FIG. 1, a projection device 100 of this embodiment includes at least one heat source 110 and a heat dissipation module 120. The heat dissipation module 120 is connected to the heat source 110 and is configured to dissipate the heat energy generated by the heat source 110. In the projection device 100, the heat source 110 includes, but is not limited to, a light source module or a light valve. The light source module may include a semiconductor light source such as a light-emitting diode, a laser, etc. and is configured to provide a beam. The light valve may include a digital micro-mirror device (DMD) and is configured to convert the beam into an image beam, but the disclosure is not limited thereto. In other embodiments, the light valve may also be a reflective optical modulator such as a liquid crystal on silicon panel (LCoS panel), or may be a transmissive optical modulator such as a transmissive liquid crystal panel, an electro-optical modulator, a magneto-optic modulator, an acousto-optic modulator (AOM), etc.

Figure 2:
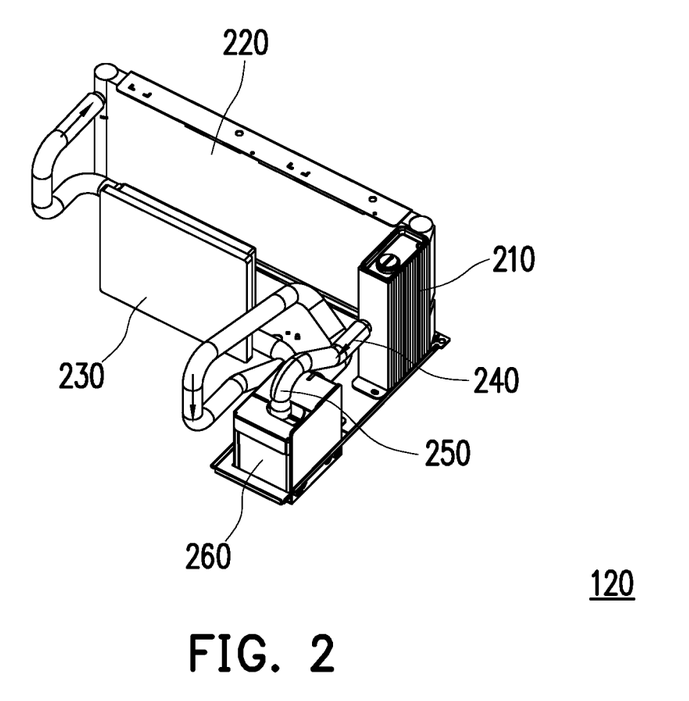
FIG. 2 is a schematic view showing a heat dissipation module according to an embodiment of the disclosure.

FIG. 2 is a schematic view showing a heat dissipation module according to an embodiment of the disclosure. Referring to FIG. 1 and FIG. 2 at the same time, the heat dissipation module 120 of this embodiment includes a tank 210, a radiator 220, a cold plate 230, a cooling fluid 240, a connection pipe 250, and a driving element 260. The connection pipe 250 connects the tank 210, the radiator 220, the cold plate 230, and the driving element 260. The driving element 260 is configured to drive the cooling fluid 240 to flow, so that the cooling fluid 240 flows in the heat dissipation module 120. In this embodiment, the driving element 260 is, for example, a pump. The cold plate 230 is configured to contact the heat source 110 to absorb and remove the heat energy generated by the heat source 110 through the cooling fluid 240. In this embodiment, the heat source 110 is, for example, a light source module. The cold plate 230 is in contact with the light source module to absorb and remove the heat energy generated by the light source module through the cooling fluid 240.

Figure 3:
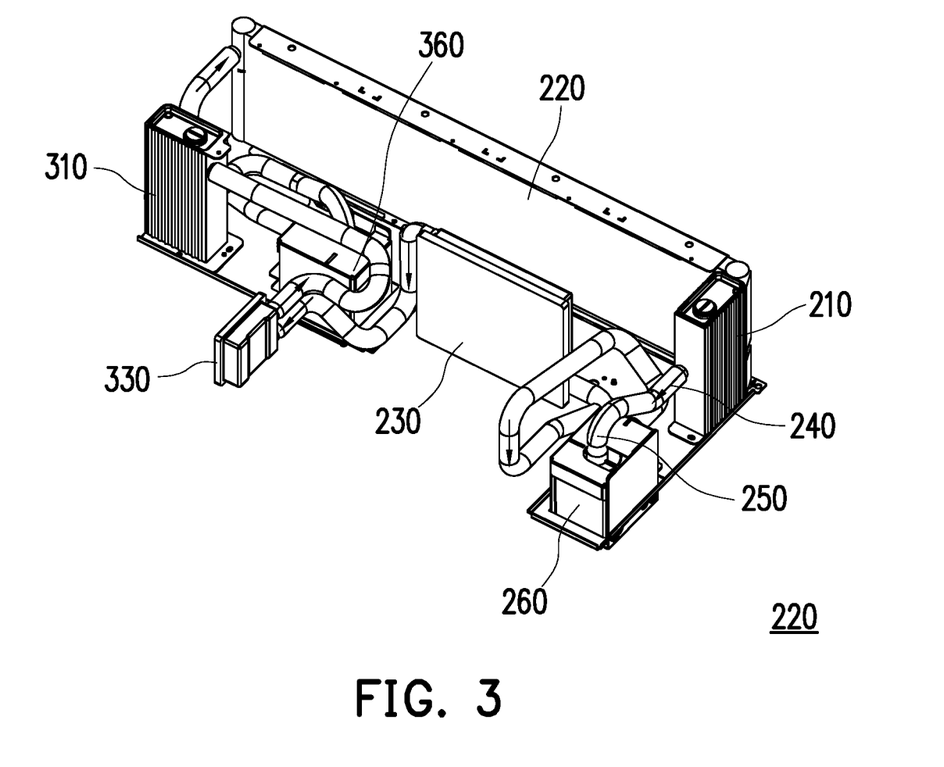
FIG. 3 is a schematic view showing a heat dissipation module according to another embodiment of the disclosure.

FIG. 3 is a schematic view showing a heat dissipation module according to another embodiment of the disclosure. Referring to FIG. 3, a heat dissipation module 220 of this embodiment includes tanks 210 and 310, a radiator 220, cold plates 230 and 330, a cooling fluid 240, a connection pipe 250, and driving elements 260 and 360. The connection pipe 250 connects the tanks 210 and 310, the radiator 220, the cold plates 230 and 330, and the driving elements 260 and 360. The driving elements 260 and 360 are configured to drive the cooling fluid 240 to flow, so that the cooling fluid 240 flows in the heat dissipation module 120. In this embodiment, the driving elements 260 and 360 are, for example, pumps, and the heat source 110 includes, for example, a light source module and a light valve. The cold plate 230 is in contact with the light source module to absorb and remove the heat energy generated by the light source module through the cooling fluid 240. The cold plate 330 is in contact with the light valve to absorb and remove the heat energy generated by the light valve through the cooling fluid 240.

In the embodiment of the disclosure, the tanks 210 and 310 respectively include a pressure sensing device configured to measure the liquid level of the cooling fluid 240 in the tanks 210 and 310. When the liquid level in the tanks 210 and 310 is lower than a predetermined value, the pressure sensing device outputs a low liquid level signal to notify the user to replenish the cooling fluid 240. In the embodiment of the disclosure, the pressure sensing device includes a pressure sensor for measuring an absolute pressure, a pressure sensor for measuring a gauge pressure, or a pressure sensor for measuring a differential pressure, but the disclosure does not specifically limit the form of the pressure sensing device. One or more embodiments will be illustrated below to describe the implementation of the tank.

Figure 4:
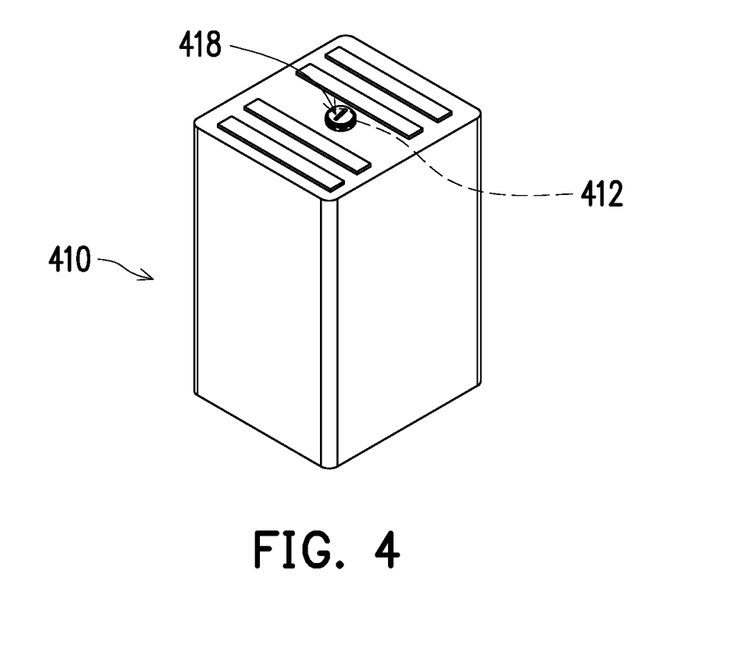
FIG. 4 is a schematic view showing a tank according to an embodiment of the disclosure.
Figure 5A:
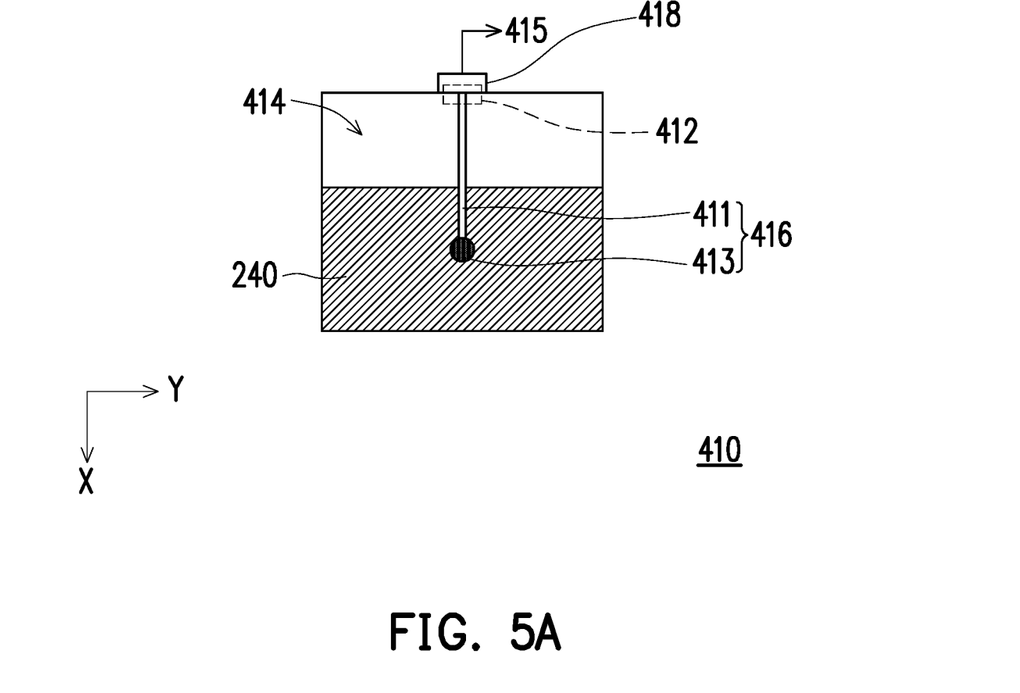
FIG. 5A is a schematic view showing the tank of the embodiment of FIG. 4 in a first use state.
Figure 5B:
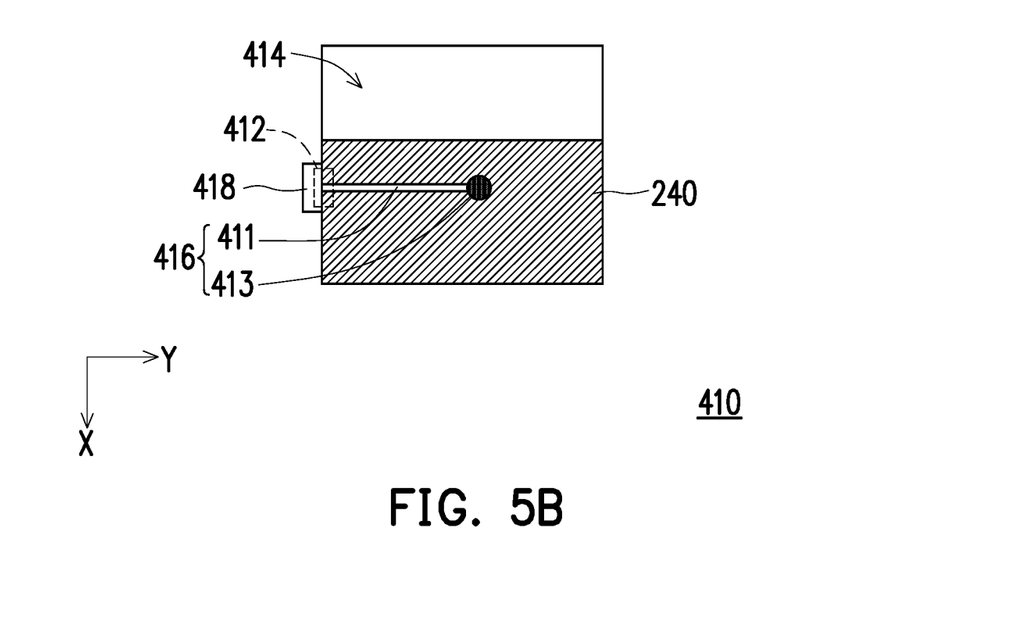
FIG. 5B is a schematic view showing the tank of the embodiment of FIG. 4 in a second use state.

FIG. 4 is a schematic view showing a tank according to an embodiment of the disclosure. FIG. 5A is a schematic view showing the tank of the embodiment of FIG. 4 in a first use state. FIG. 5B is a schematic view showing the tank of the embodiment of FIG. 4 in a second use state. Referring to FIG. 4 to FIG. 5B, a tank 410 of this embodiment has an opening 412 and an accommodating space 414. The accommodating space 414 is configured to accommodate the cooling fluid 240. The tank 410 includes a pressure sensing device 416 and a level screw 418. The pressure sensing device 416 is configured to measure the liquid level of the cooling fluid 240 in the accommodating space 414. The level screw 418 is disposed at the opening 412.

Specifically, the pressure sensing device 416 includes a level bar 411 and a pressure sensor 413. The level bar 411 penetrates through the opening 412 of the tank 410. The opening 412 for mounting the pressure sensing device 416 and the opening for replenishing the cooling fluid 240 may be the same or different holes. The pressure sensor 413 is disposed at one end of the level bar 411, and the other end of the level bar 411 is connected to the level screw 418. In the first use state, the one end of the level bar 411 provided with the pressure sensor 413 is inserted into the tank 410 along a gravity direction X, and the pressure sensor 413 is disposed below the liquid level of the cooling fluid 240 in the tank 410, as shown in FIG. 5A. After being turned over, the tank 410 is in the second use state, as shown in FIG. 5B. The level bar 411 is inserted into the tank 410 along a horizontal direction Y perpendicular to the gravity direction X, and the pressure sensor 413 is disposed below the liquid level of the cooling fluid 240 in the tank 410.

In FIG. 5A and FIG. 5B, the signal line for transmitting a low liquid level signal 415 may be buried in the level bar 411 or wound outside the level bar 411, and may extend outward to output the signal. Therefore, when the liquid level in the tanks 210 and 310 is lower than the predetermined value, the signal line for transmitting the low liquid level signal 415 may transmit the low liquid level signal 415 output by the pressure sensor 413 to the motherboard of the projection device 100, so that the motherboard can notify the user to replenish the cooling fluid 240.

Figure 6:
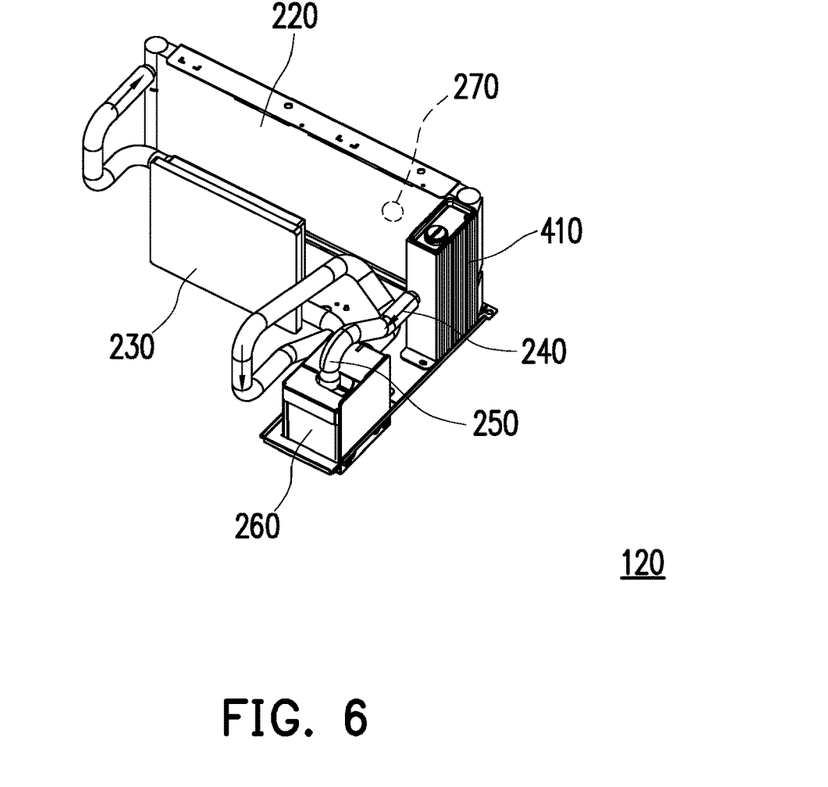
FIG. 6 is a schematic view showing a heat dissipation module according to another embodiment of the disclosure.

Corresponding to the embodiment of the tank in FIG. 4 to FIG. 5B, the heat dissipation module 120 may further include a gravity sensor configured to sense the gravity direction X, as shown in FIG. 6. FIG. 6 is a schematic view showing a heat dissipation module according to another embodiment of the disclosure. The heat dissipation module 120 of this embodiment further includes a gravity sensor 270. The gravity sensor 270 of FIG. 6 is configured to sense the gravity direction X, and its arrangement position is only intended for illustration, and the disclosure is not limited thereto. The gravity sensor 270 may be disposed at any suitable position in the heat dissipation module 120. In the first use state, when the pressure sensor 413 is placed below the fluid level of the cooling fluid 240 in the tank 410, and the tank 410 is in a cube shape, the heat dissipation module 120 may be used for multiple angles to measure the liquid level. After being turned over, the tank 410 is in the second use state. In the second use state, when the pressure sensor 413 is placed below the fluid level of the cooling fluid 240 in the tank 410, by confirming the gravity direction through the gravity sensor 270, the liquid level can still be measured. Adaptable for different arrangement positions of the projection device 100, the heat dissipation module 120 of this embodiment can confirm the gravity direction through the gravity sensor 270 even in different use states to further measure the liquid level of the cooling fluid 240.

Figure 7A:
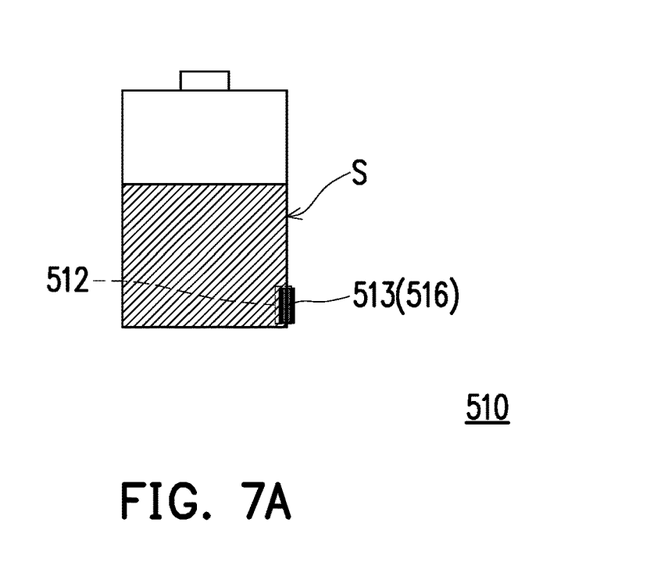
FIG. 7A is a schematic view showing a tank according to another embodiment of the disclosure.
Figure 7B:
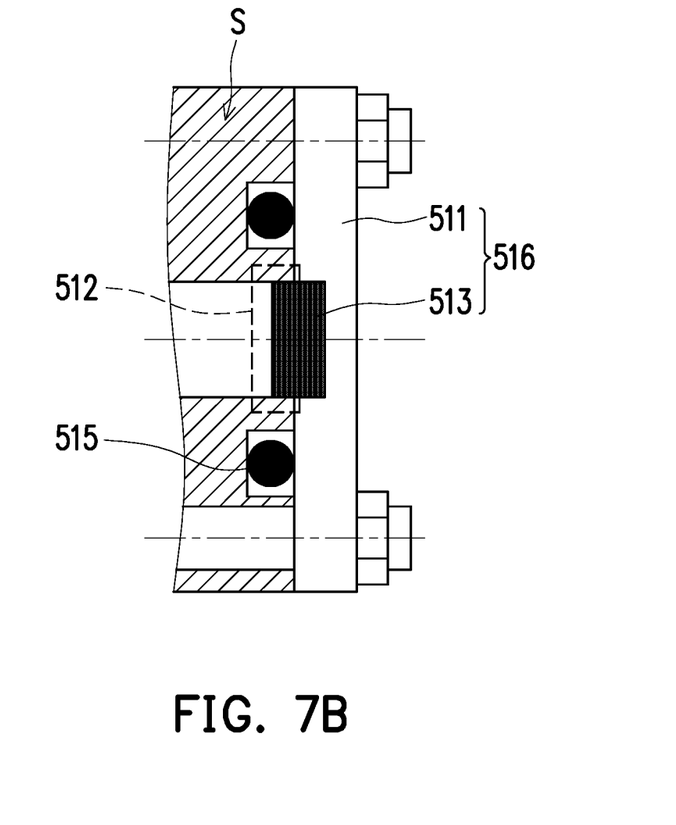
FIG. 7B is a schematic view showing a mounting hole of the embodiment of FIG. 7A.

FIG. 7A is a schematic view showing a tank according to another embodiment of the disclosure. FIG. 7B is a schematic view showing a mounting hole of the embodiment of FIG. 7A. Referring to FIG. 7A and FIG. 7B, a tank 510 of this embodiment has a mounting hole 512 provided on a sidewall S. A pressure sensing device 516 includes a pressure sensor 513 and a back plate 511. The pressure sensor 513 is disposed at the mounting hole 512, and the back plate 511 is disposed at the sidewall S. The back plate 511 seals the pressure sensor 513 to the mounting hole 512 of the sidewall S of the tank 510. A ring-shaped gasket 515 may be provided between the back plate 511 and the sidewall S. The gasket 515 is a ring-shaped elastic body having a circular cross-section, for example, and is fixed in a groove of the sidewall S. During the assembly process, the gasket 515 is compressed by the back plate 511 and the sidewall S, which thus creates a sealed interface. In this embodiment, "sealing" means that, after the pressure sensor 513 is mounted at the mounting hole 512, the cooling fluid 240 in the tank 510 is sealed without flow out.

In summary of the above, the embodiments of the disclosure exhibit at least one of the following advantages or effects. In the embodiments of the disclosure, the heat dissipation module can prevent reduced cooling effect or failure in the driving element resulting from insufficient cooling fluid in the tank. In addition, upon assembly, the pressure sensing device can confirm in real-time the liquid level in the tank and directly read the pressure gauge value. Therefore, it is possible to provide a real-time detection function. Moreover, a small-sized, highly-reliable, and low-cost pressure gauge may be used as the pressure sensing device, so the costs can be reduced.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present invention" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A projection device comprising at least one heat source and a heat dissipation module, wherein
the heat dissipation module is connected to the at least one heat source and is configured to dissipate heat energy generated by the at least one heat source, wherein
the heat dissipation module comprises a tank, at least one radiator, at least one cold plate, a cooling fluid, a gravity sensor, a level bar and a connection pipe, wherein the connection pipe connects the tank, the at least one radiator, and the at least one cold plate, so that the cooling fluid flows in the heat dissipation module, wherein the tank comprises a pressure sensing device configured to measure a liquid level of the cooling fluid in the tank,
when the tank is in a first use state and a second use state, the pressure sensing device is placed below a fluid level of the cooling fluid and directly contact with the cooling fluid in the tank, wherein the first use state is changed to the second use state after the tank is turned over, wherein the level bar of the heat dissipation module extends along a gravity direction in the first use state of the tank, and the level bar of the heat dissipation module extends along a direction that is different from the gravity direction in the second use state of the tank, wherein in the first use state and the second use state of the tank, the gravity sensor is configured to sense the gravity direction to measure the liquid level of the cooling fluid in the tank.

2. The projection device according to claim 1, wherein the tank has an opening, and the pressure sensing device comprises a pressure sensor, wherein the pressure sensor is disposed at one end of the level bar, and the level bar penetrates through the opening of the tank.

3. The projection device according to claim 2, wherein the tank comprises a level screw disposed at the opening, and another end of the level bar is connected to the level screw.

4. The projection device according to claim 2, wherein the level bar is inserted into the tank along the gravity direction.

5. The projection device according to claim 4, wherein after the tank is turned over, the level bar is inserted into the tank along a horizontal direction perpendicular to the gravity direction.

6. The projection device according to claim 1, wherein a mounting hole is provided on a sidewall of the tank, and the pressure sensing device comprises a pressure sensor and a back plate, wherein the pressure sensor is disposed at the mounting hole, the back plate is disposed at the sidewall, and the back plate is configured to seal the pressure sensor to the mounting hole of the sidewall.

7. The projection device according to claim 1, wherein the pressure sensing device comprises a pressure sensor which measures an absolute pressure, a pressure sensor which measures a gauge pressure, or a pressure sensor which measures a differential pressure.

8. The projection device according to claim 1, wherein when the liquid level in the tank is lower than a predetermined value, the pressure sensing device outputs a low liquid level signal to notify a user to replenish the cooling fluid.

9. The projection device according to claim 1, wherein the heat dissipation module further comprises at least one driving element configured to drive the cooling fluid to flow.

10. A tank comprising an accommodating space, a pressure sensing device, a gravity sensor and a level bar, wherein
the accommodating space is configured to accommodate a cooling fluid; and
the pressure sensing device is configured to measure a liquid level of the cooling fluid in the accommodating space,
when the tank is in a first use state and a second use state, the pressure sensing device is placed below a fluid level of the cooling fluid and directly contact with the cooling fluid in the tank, wherein the first use state is changed to the second use state after the tank is turned over,
wherein the level bar of the heat dissipation module extends along a gravity direction in the first use state of the tank, and the level bar of the heat dissipation module extends along a direction that is different from the gravity direction in the second use state of the tank,
wherein in the first use state and the second use state of the tank, the gravity sensor is configured to sense the gravity direction to measure the liquid level of the cooling fluid in the tank.

11. The tank according to claim 10, wherein the tank has an opening, and the pressure sensing device comprises a pressure sensor and a level bar, wherein the pressure sensor is disposed at one end of the level bar, and the level bar penetrates through the opening of the tank.

12. The tank according to claim 11, further comprising a level screw disposed at the opening, wherein another end of the level bar is connected to the level screw.

13. The tank according to claim 11, wherein the level bar is inserted into the tank along a gravity direction.

14. The tank according to claim 13, wherein after the tank is turned over, the level bar is inserted into the tank along a horizontal direction perpendicular to the gravity direction.

15. The tank according to claim 10, wherein a mounting hole is provided on a sidewall of the tank, and the pressure sensing device comprises a pressure sensor and a back plate, wherein the pressure sensor is disposed at the mounting hole, the back plate is disposed at the sidewall, and the back plate is configured to seal the pressure sensor to the mounting hole of the sidewall.

16. The tank according to claim 10, wherein the pressure sensing device comprises a pressure sensor which measures an absolute pressure, a pressure sensor which measures a gauge pressure, or a pressure sensor which measures a differential pressure.

17. The tank according to claim 10, wherein when the liquid level in the tank is lower than a predetermined value, the pressure sensing device outputs a low liquid level signal to notify a user to replenish the cooling fluid.

\* \* \* \* \*